US011073334B2

(12) United States Patent
Jumpertz

(10) Patent No.: US 11,073,334 B2
(45) Date of Patent: Jul. 27, 2021

(54) FURNACE HAVING VERTICAL ARRANGEMENT OF THE COMBUSTION CHAMBER FOR DENTAL COMPONENTS AND HEAT-RESISTANT BASE

(71) Applicant: DENTSPLY SIRONA Inc., York, PA (US)

(72) Inventor: Rainer Jumpertz, Bensheim (DE)

(73) Assignee: DENTSPLY SIRONA INC., York, PA (US)

( * ) Notice: Subject to any disclaimer, the term of this patent is extended or adjusted under 35 U.S.C. 154(b) by 45 days.

(21) Appl. No.: 16/077,516

(22) PCT Filed: Feb. 22, 2017

(86) PCT No.: PCT/EP2017/053972
§ 371 (c)(1),
(2) Date: Aug. 13, 2018

(87) PCT Pub. No.: WO2017/144488
PCT Pub. Date: Aug. 31, 2017

(65) Prior Publication Data

US 2019/0049184 A1 Feb. 14, 2019

(30) Foreign Application Priority Data

Feb. 22, 2016 (DE) ......................... 102016202703.4

(51) Int. Cl.
*A61C 13/20* (2006.01)
*F27B 17/02* (2006.01)
*F27D 15/02* (2006.01)

(52) U.S. Cl.
CPC ............ *F27B 17/025* (2013.01); *F27D 15/02* (2013.01)

(58) Field of Classification Search
CPC ........ A61C 13/20; A61C 13/08; F27B 17/025
See application file for complete search history.

(56) References Cited

U.S. PATENT DOCUMENTS 4,092,138 A * 5/1978 Beitner .................. A61C 19/00 165/48.1
5,788,485 A 8/1998 Gruenenfelder
(Continued)

FOREIGN PATENT DOCUMENTS

DE 19606493 C1 9/1997
EP 0755883 A1 1/1997
(Continued)

OTHER PUBLICATIONS

International Preliminary Report on Patentability (IPRP) Chapter II; PCT/EP2017/053972; Jun. 18, 2018 (completed).
(Continued)

*Primary Examiner* — Gregory A Wilson
(74) *Attorney, Agent, or Firm* — Dentsply Sirona Inc.

(57) ABSTRACT

The invention relates to a furnace having a vertical orientation for dental components, comprising a combustion chamber, which is open at the bottom and the opening of which can be closed by means of a furnace door, which is lowered in the vertical direction in the open position, and comprising a depositing region for the heated component, which depositing region is arranged at a distance from the opening in the combustion chamber. The depositing region is part of the furnace, and a cooling device that acts on the depositing region is arranged on or in the furnace. A heat-resistant base has a heat-resistant support arranged in a housing, which support has an active or passive cooling device, which, for example, has a Peltier element.

14 Claims, 7 Drawing Sheets

(56) References Cited

U.S. PATENT DOCUMENTS

| | | | | |
|---|---|---|---|---|
| 8,109,761 | B1 * | 2/2012 | Neal | F27D 9/00<br>432/205 |
| 8,181,290 | B2 * | 5/2012 | Brykalski | A61G 7/05<br>5/423 |
| 9,480,544 | B2 * | 11/2016 | Rohner | F27D 19/00 |
| 9,784,501 | B2 * | 10/2017 | Jussel | A61C 13/20 |
| 9,951,957 | B2 * | 4/2018 | Park | F23B 60/00 |
| 2005/0250067 | A1 | 11/2005 | Rohner | |
| 2010/0047731 | A1 | 2/2010 | Zubler | |
| 2011/0080638 | A1 * | 4/2011 | Feger | G02B 21/084<br>359/385 |
| 2015/0247672 | A1 * | 9/2015 | Schmidt | F27D 21/00<br>432/13 |
| 2016/0317257 | A1 | 11/2016 | Fornoff | |
| 2017/0135490 | A1 * | 5/2017 | Andrix | H02J 7/0042 |
| 2019/0219336 | A1 * | 7/2019 | He | F27B 17/02 |

FOREIGN PATENT DOCUMENTS

| | | | |
|---|---|---|---|
| EP | 1593922 | A1 | 11/2005 |
| EP | 2101133 | B1 | 7/2016 |
| WO | 2013068312 | A1 | 5/2013 |
| WO | 201416320 | A1 | 1/2014 |

OTHER PUBLICATIONS

International Search Report; PCT/EP2017/053972; May 5, 2017 (completed); dated May 17, 2017.

Written Opinion of the International Searching Authority; PCT/EP2017/053972; May 5, 2017 (completed); dated May 17, 2017.

* cited by examiner

FURNACE HAVING VERTICAL ARRANGEMENT OF THE COMBUSTION CHAMBER FOR DENTAL COMPONENTS AND HEAT-RESISTANT BASE

TECHNICAL FIELD

The invention relates to a furnace having a vertical arrangement of the combustion chamber for dental components and to a heat-resistant base for heated, in particular sintered dental components, which are removed from the furnace and have residual heat.

These types of furnaces for dental components are often designed as tabletop devices, and therefore have a substantially smaller structure than conventional industrial furnaces. It is also particular advantageous if no separate high voltage current connection is required to operate the furnace for dental components. This is not only a sintering process; drying furnaces or furnaces for crystallization or glazing can, in principle, be used as well. These types of furnaces are, among other things, differentiated by temperature range. Sintering typically requires a temperature range of 1,500° C.-1,600° C., crystallization of glass ceramic and glazing, i.e. the coating of zirconium oxide with glass ceramic, takes place at temperatures of 800° C. and drying a dental component after wet machining takes place in a temperature range from 150° C.-200° C.

BACKGROUND OF THE INVENTION

A sintering furnace for dental components, in which a component disposed on a carrier is removed from the combustion chamber together with the carrier after sintering and set down on a fire-resistant base at room temperature, is known from DE 10 2012 213 279 A1. The carrier assumes the function of a temperature buffer to compensate for a potential thermal shock. In this cooling zone, the component disposed on the carrier cools from a temperature between 275 and 600 degrees to a temperature between 100 and 200 degrees Celsius. The component is subsequently removed from the carrier and placed on a metallic base at room temperature, where the component is warm to the touch after a maximum of 2 minutes and can be processed further.

DE 10 2013 226 497 discloses the operation of a dental furnace having a temperature profile with a phase for cooling.

A dental furnace, in which a temperature-dependent position control of the closing plate is provided, is known from DE 10 2006 032 655 A1. The drying prior to firing takes place independently of the heating or cooling phase of the combustion chamber, and the drying time of the firing material placed on the closing plate before firing can be reduced.

The fact that zirconium oxide and aluminum oxide can handle short cooling times, and can even be cooled in water, is well-known. Glass ceramic is damaged when cooled in water, but cooling in ambient air at room temperature is unproblematic.

The object of the invention is to reduce the cooling time of a component after sintering, crystallization, glazing or drying.

SUMMARY OF THE INVENTION

Thanks to the configuration according to the invention of a furnace having a vertical orientation for dental components, comprising a combustion chamber which is open at the bottom and the opening of which can be closed by means of a furnace door, which is lowered in the vertical direction in the open position, and comprising a depositing region for the heated component, which depositing region is arranged at a distance from the opening in the combustion chamber, wherein the depositing region is part of the furnace and wherein a cooling device that acts on the depositing region is arranged on or in the furnace, the cooling time of the component removed from the furnace and placed on the support can be reduced compared to a cooling of the component by pure convection at room temperature.

A depositing region as part of the furnace also comprises a base, which is connected to the furnace and can be pushed out only as required.

The depositing region can advantageously comprise a heat-resistant support for the heated component and the cooling device can act on the support.

A material is heat-resistant if it is resistant to thermal loads. Specifically this means that, during operation at the intended temperatures of the component, the support does not experience any changes that permanently adversely affect the use. It is of particular importance that, for example after a sintering process, the 1,000° C. hot dental component can already be placed on the support, instead of waiting about 5 minutes for it to cool to ca. 400° C., as a result of which the overall cooling process is accelerated.

In order for the dental components, in particular restorations, not to suffer a thermal shock at the points of contact, it is advantageous to use a material, the temperature of which adapts quickly to the hot component, for example a support plate made of aluminum. Furthermore, if a black anodized aluminum support sheet is used, discolorations can largely be avoided.

The support can advantageously comprise ventilation openings, by means of which a cooling air flow can be guided onto the component to be arranged on the supports. The ventilation openings can furthermore be fluidically connected to a fan to provide a cooling air flow. As a result, both active and passive cooling of the component located on the support can be achieved.

An air-permeable, heat-insulating insert part can advantageously be arranged between the fan and the support to prevent the thermal radiation of the component from affecting the fan.

Instead of an air flow or in addition to an air flow, the support can be cooled with the aid of a Peltier element, which is thermally coupled directly to the support.

The depositing region is advantageously arranged outside the thermal radiation field of the open combustion chamber. In a vertical furnace, this can, for example, be below the furnace door or on the furnace itself. Cooling can then occur without the further ongoing heat input by the thermal radiation from the combustion chamber.

According to a further development, the furnace can comprise two furnace doors, of which one is brought into a cooling position after the opening of the combustion chamber has been cleared, while the other furnace door closes the combustion chamber in the closed position. The loading of the combustion chamber with the component and the cooling of the component can thus be carried out, at least in part, simultaneously.

Instead of or in addition to the closed position, the furnace can also be designed in such a way that a drying position is adopted, in which the furnace door is at a distance from the combustion chamber and does not yet close said combustion chamber, so that the component disposed on the furnace door is subjected only to a temperature that is lower than the temperature in the combustion chamber. Once the drying process has been completed, the furnace door is brought from the drying position into the closed position in which the combustion chamber is closed by the furnace door, and the dried component is subsequently introduced into the combustion chamber.

The furnace can advantageously comprise a device for automatically repositioning the heated component from the open combustion chamber into the depositing region.

The device for automatically repositioning the heated component can advantageously comprise a gripper arm or a robot arm.

The device for automatically repositioning the heated component can advantageously comprise a tappet, a chute and a collecting basket.

The invention further relates to a heat-resistant base for a heated dental component comprising a heat-resistant support arranged in a housing, wherein the support comprises an active cooling device.

The support can advantageously comprise ventilation openings, by means of which a cooling air flow is guided onto a component to be arranged on the support.

A fan can advantageously be arranged below the support. A Peltier element can alternatively or additionally be arranged below the support.

The depositing region or the support can advantageously comprise means for temperature measurement in the depositing region or the support or the component to be cooled, for example a temperature sensor or a thermal imaging camera.

Comparison means and display means, to compare the temperature of the component to be cooled to a predetermined limit temperature and to display said temperature when the limit temperature is reached, can advantageously be provided. For permanent thermal monitoring of the dental component throughout its entire cooling phase by means of a thermal sensor or a thermal imaging camera, the earliest possible time to touch the component for the purpose of further processing after the limit temperature has been reached can be displayed or brought to the attention of the user in any manner conceivable, for example as an acoustic and/or optical signal or via an email notification or some other type of electronic message.

With the aid of a control unit, the cooling device can advantageously provide a cooling output that is dependent on the means for temperature measurement.

A plurality of supports having a plurality of cooling devices can advantageously be provided in a housing. A furnace designed in this way, or such a base, then makes it possible to store a plurality of heated components for cooling.

Advantageously, the cooling output of each support is individually controllable. The cooling output of the plurality of cooling devices can therefore be operated individually and in a temperature-dependent manner with the aid of a controller.

The cooling device acting on the depositing region can advantageously be arranged at a distance from the depositing region in a housing section, past which the component is moved when it is brought out of the combustion chamber.

The cooling device can thus be mounted in an already existing housing section, which extends, for example, between a closed position of the furnace door and a loading position of the furnace door. A repositioning of the component is not necessary then, because the support surface of the furnace door for the component to be brought into the combustion chamber and sintered is at the same time also the support for cooling the sintered component after the combustion chamber has been opened.

BRIEF DESCRIPTION OF THE DRAWINGS

Design examples of the invention are shown in the drawing. The drawing shows.

DETAILED DESCRIPTION OF THE INVENTION

Figure 1:
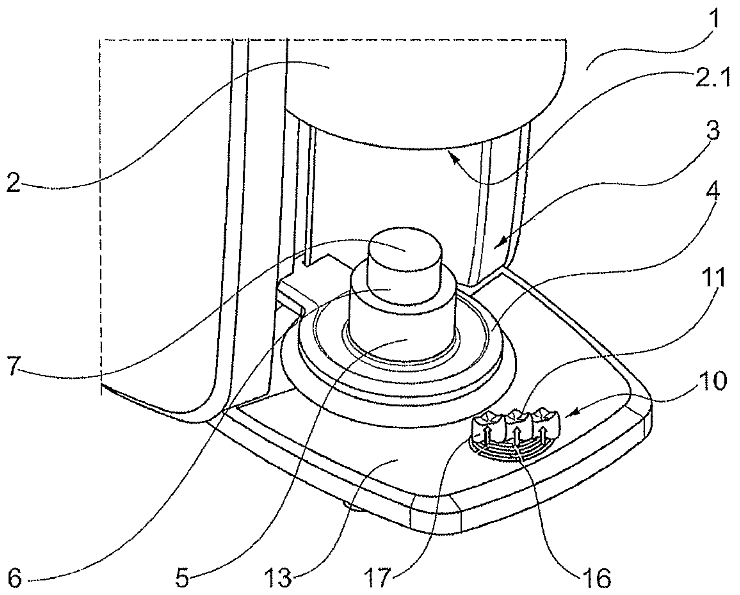
FIG. 1 a lower part of a dental furnace with an open combustion chamber and a depositing region arranged in front of it.

FIG. 1 shows a lower part of a vertically oriented dental furnace 1 with a combustion chamber 2, which is open at the bottom, and the opening 2.1 of which can be closed by means of a furnace door 3, which is lowered in the vertical direction in the open position. The lowered furnace door 3, which is in a loading position, comprises a plate-shaped wall section 4, on which a lower and an upper door stone 5, 6 are provided to insulate the combustion chamber. On its upper side, the upper door stone 6 comprises a support surface 7 for a component for heat treatment in the combustion chamber 2. To charge the furnace, the component is placed on the support surface 7 of the furnace door, which is in the loading position, and the furnace door is moved vertically upward and closes the combustion chamber in the closed position. After the conclusion of the heat treatment in the closed combustion chamber 2, the furnace door is opened by lowering and, after reaching the loading position, the component, which still has residual heat, is removed from the support surface 7 and brought into a depositing region 10, which is arranged at a distance from the opening 2.1 of the combustion chamber 2 as part of the furnace 1, in this case in front of the opening 2.1 of the combustion chamber 2. It is equally conceivable, however, to arrange the depositing region 10 laterally adjacent to the opening 2.1 of the combustion chamber.

The component 11, which is to be subjected or has been subjected to the heat treatment in the combustion chamber 2, can be set down on said depositing region 10.

Figure 1A:
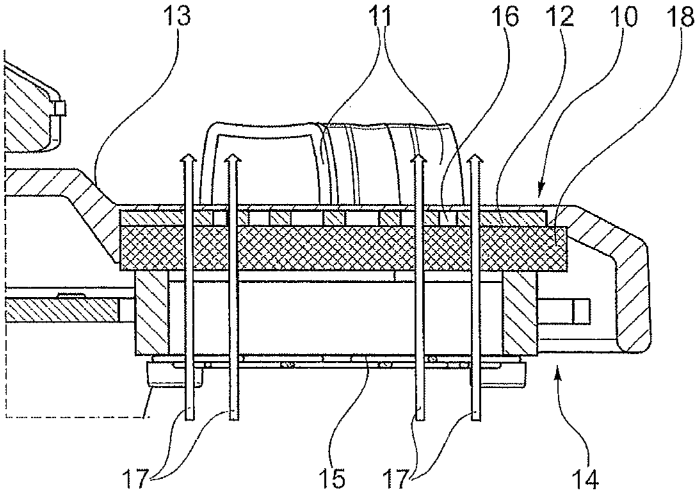
FIG. 1A the depositing region of FIG. 1 in detail with the component placed upon it.

As can be seen from FIG. 1A, the depositing region 10 comprises a heat-resistant support 12, on which the heated component 11 can be deposited. The depositing region 10 is formed as part of a housing 13 of the dental furnace 1, more precisely as part of a base plate.

Provided in the depositing region 10 is a cooling device 14, which acts on the support 12 and comprises a fan 15 mounted to the housing 13. Via ventilation slits 16 in the support 12, said fan directs an air flow 17 onto the component 11, which has been removed from the combustion chamber and placed on the support. In the case of a furnace mounted on a base, there is a gap between the depositing region 10 and the base. Cooling air can pass through this gap to the underside of the support or can also be pulled in by the fan and cool the support.

An air-permeable, heat-insulating insert part 18 is arranged between the fan 15 and the support 12 to prevent the thermal radiation of the component 11 from affecting the fan 15.

Figure 2:
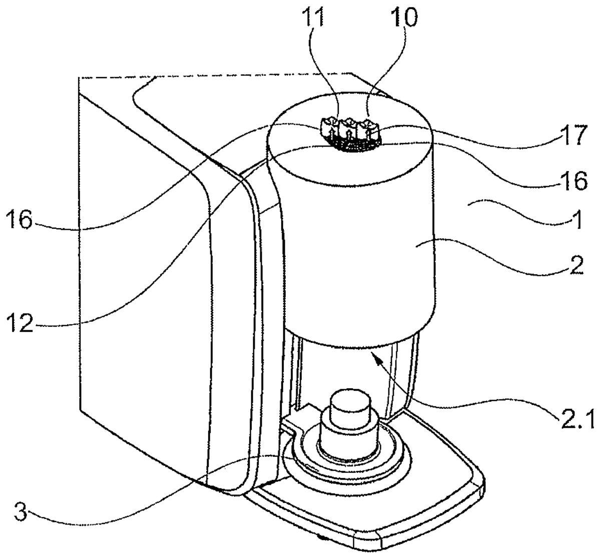
FIG. 2 a dental furnace with an open combustion chamber and a depositing region arranged on the combustion chamber.

FIG. 2 shows a dental furnace 1 with an open furnace door 3 of the combustion chamber 2 and a depositing region 10, which is arranged on the combustion chamber 2 at a distance from the opening 2.1 of the combustion chamber 2 and has a support 12 provided with ventilation slits 16, via which an air flow 17 is directed onto the component 11.

Figure 3:
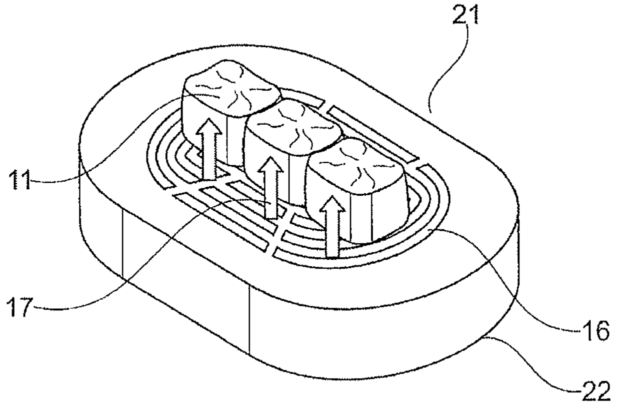
FIG. 3 a heat-resistant base, which is formed independently of a dental furnace.

FIG. 3 shows a heat-resistant base 21 for a heated dental component 11, which is formed independently of a dental furnace and has a heat-resistant support, which is arranged in a housing 22 and comprises an active or passive cooling device. In this case, ventilation slits 16, via which an air flow can reach the component 11, are provided in the support as passive cooling device. The air flow 17 can be amplified by a not depicted fan in the housing 22, which creates an active cooling device.

Figure 4:
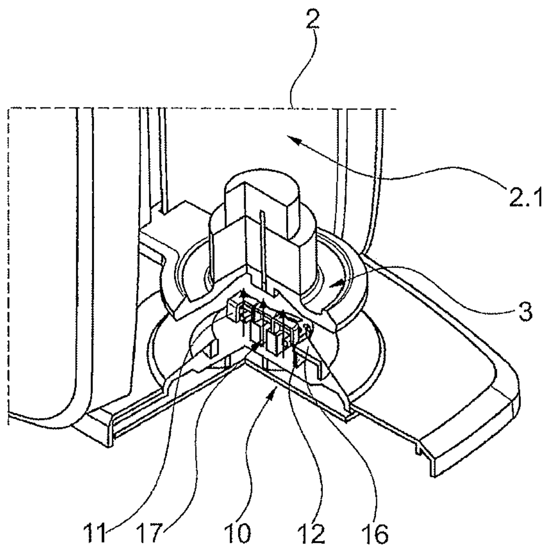
FIG. 4 a dental furnace with an open combustion chamber and a depositing region arranged below the open furnace door.

FIG. 4 shows a dental furnace with an open combustion chamber 2 and a depositing region 10, which is arranged below the open furnace door 3 at a distance from the opening 2.1 of the combustion chamber 2, pictured here in partial section. The support 12, on which the component 11 is located, is arranged in the depositing region 10. As already depicted in FIG. 1, ventilation slits 16, through which an air flow 17 can escape onto the component 11, are provided in the support 12. The structure can be the same as that of the base from FIG. 3.

Figure 5:
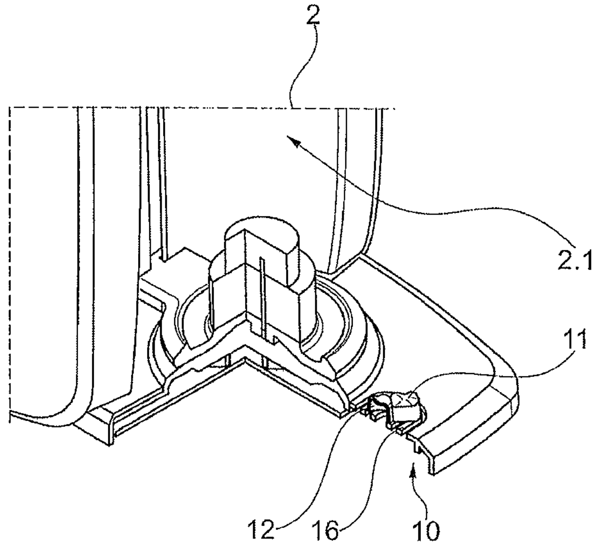
FIG. 5 a dental furnace with an open combustion chamber and a depositing region with free convection arranged in front of the combustion chamber.

FIG. 5 shows a dental furnace 1 with an open combustion chamber 2 and a depositing region 10 with free convection arranged in front of the combustion chamber 2 at a distance from the opening 2.1 of the combustion chamber 2. Ventilation slits 16 are again provided in the support 10 for this purpose; there is, however, no need for the presence of a fan. An air flow is produced by natural convection of the still warm component 11.

Figure 6:
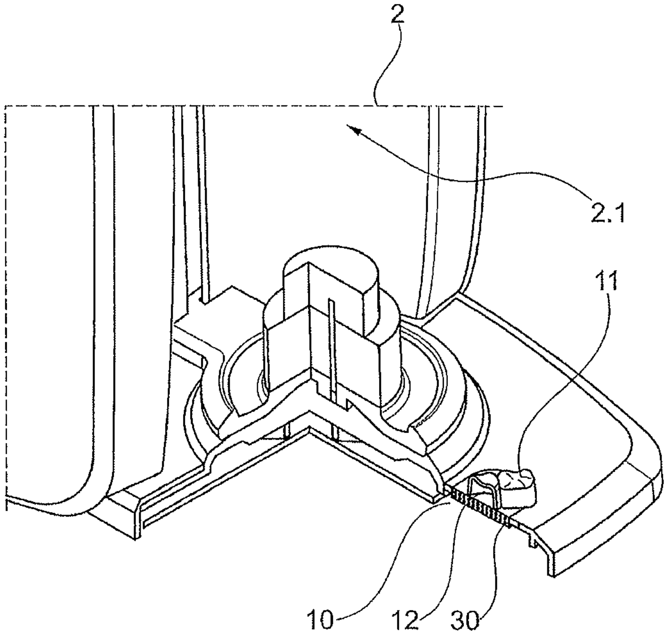
FIG. 6 a dental furnace with an open combustion chamber and a depositing region with a Peltier element arranged in front of the combustion chamber.

FIG. 6 shows a dental furnace with an open combustion chamber 2 and a depositing region 10, which is arranged in front of the combustion chamber 2 at a distance from the opening 2.1 of the combustion chamber 2 and has a Peltier element 30 instead of a passive or active air flow as in the preceding FIGS. 1 to 5.

The Peltier element 30 is thermally coupled to the support 12 in such a way that its cool side interacts with and cools the support 12, and its warm side is directed downward and is cooled by the ambient air below the housing.

The base from FIG. 3 can likewise comprise a Peltier element as an active cooling device instead of a fan.

As in the other embodiments, in the case of a furnace mounted on a base, there is a gap between the depositing region and the base. Cooling air can pass through this gap to the underside of the support or can also be pulled in by the fan and cool said support.

Figure 7:
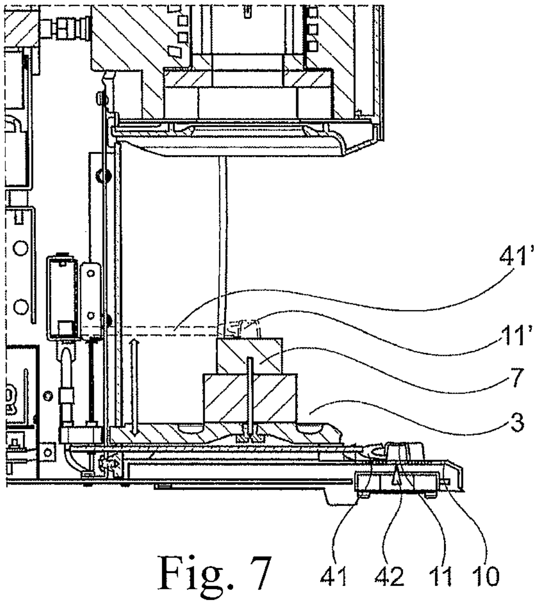
FIG. 7 the dental furnace of FIG. 1 with automatic repositioning of the hot component by means of a gripper arm or robot arm.

FIG. 7 shows the dental furnace from FIG. 1 with automatic repositioning of the hot component 11', 11 disposed on the open furnace door 3 with the aid of a gripper arm 41', 41 or a robot arm from the upper door stone 7 into the depositing region 10, and with additional temperature measurement via a sensor 42 for measuring the temperature in the depositing region 10.

Figure 8:
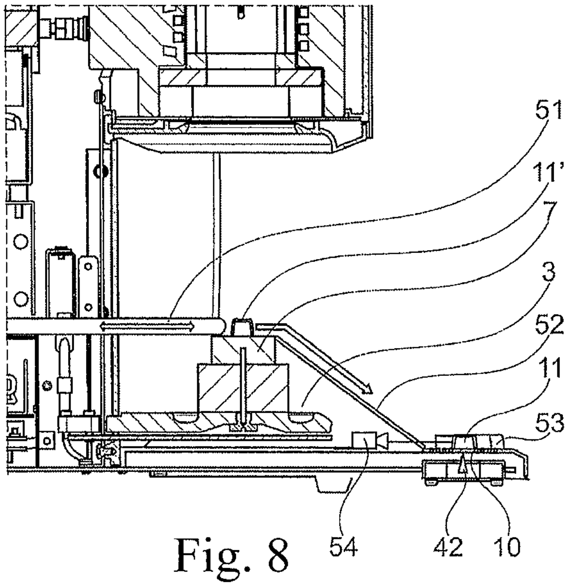
FIG. 8 the dental furnace of FIG. 1 with automatic repositioning of the hot component by means of a tappet (e.g. linear actuator or compressed air pipe), a chute and a collecting basket.

FIG. 8 shows the dental furnace from FIG. 1 with automatic repositioning of the hot component 11', 11 disposed on the open furnace door 3 with the aid of a tappet 51, which can, for example, be designed as a linear actuator or as a compressed air pipe, a chute 52 and a collecting basket 53 from the upper door stone 7 into the depositing region 10, likewise with additional temperature measurement in the depositing region via a sensor 42. A thermal imaging camera 54 is provided as well, which is directed toward the component disposed on the support 12 and captures a thermal image.

Figure 9:
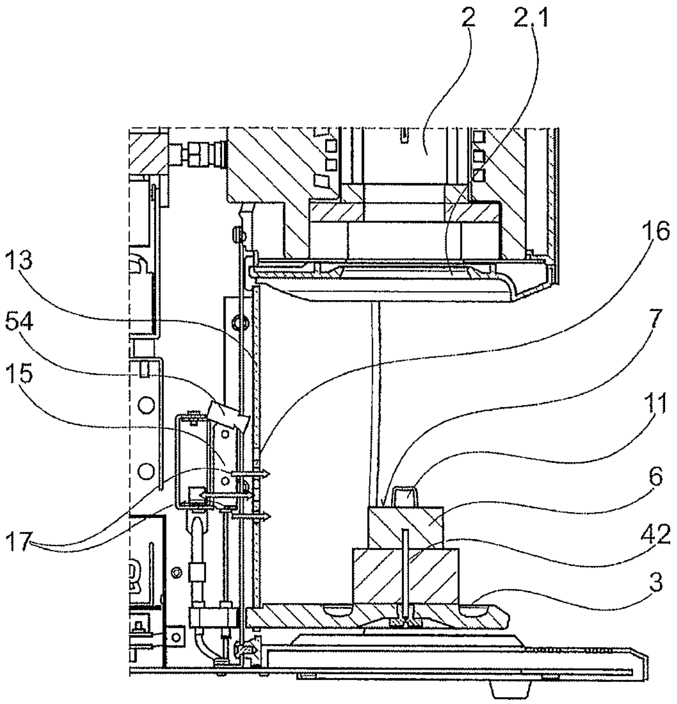
FIG. 9 a dental furnace with an open combustion chamber and a depositing region arranged on the furnace door of the open combustion chamber, with a ventilation system mounted in the housing of the furnace.

FIG. 9 shows a dental furnace 1 with an open combustion chamber 2 and a support surface 7 for the component 11 arranged on the upper door stone 6 of the furnace door 3, which is in a loading position. A cooling device is mounted in the housing 13, at a distance from the support surface 7. In this case, the support surface 7 fulfills the function of a depositing region, because the component remains on the support surface 7 during cooling. Cooling occurs with the aid of an air flow 17, which is produced by a fan 15 and escapes from the housing 13 via ventilation slits 16 in the housing 13 directed onto the component 11. To change the location from which the air flow 17 directed onto the component 11 leaves the housing 13, the fan 15 can optionally be adjustable relative to the housing. In this case, the loading position of the furnace door is also the same as the cooling position and repositioning is not necessary, because the sinter support and the cooling support are one and the same. In order to improve cooling, provision can be made to change the cooling position relative to the loading position instead of changing the position of the fan.

During the cooling of the component 11, the temperature is measured via a sensor 42 for temperature measurement in the upper door stone 6; thermal image acquisition with a thermal imaging camera 54 mounted in the housing 13 can optionally be provided as well.

The cooling device acting on the depositing region is arranged in a housing section, past which the component 11 is moved when it is brought out of the combustion chamber 2. The cooling device is mounted in an already existing housing section. The thermal imaging camera can additionally also be arranged in this housing section, to record the cooling of the component or to evaluate said cooling for the purpose of controlling the cooling device.

Figure 10:
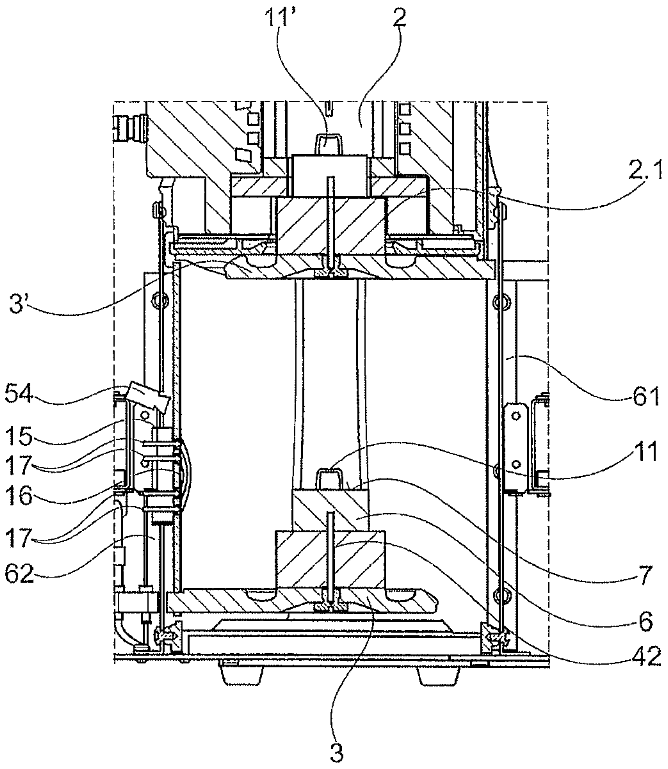
FIG. 10 the dental furnace of FIG. 9 with two furnace doors, one of which is moved into a special cooling position, while the other closes the combustion chamber.

FIG. 10 shows the dental furnace from FIG. 9 with two furnace doors 3, 3', one of which, namely furnace door 3, is moved into a cooling position corresponding to that of FIG. 9 after the opening 2.1 of the combustion chamber 2 has been cleared, while the other furnace door 3' closes the combustion chamber 2 in the closed position. In the case of a depicted vertical furnace, the closed position is the upper position, the cooling position is the lower position, and the cooling device is arranged in the housing between these two positions.

The alternating adjustment of the two furnace doors 3, 3' is effected via one respective adjusting mechanism 61, 62 for each one of the two furnace doors 3, 3'. For at least one adjusting mechanism 62, a pivoting movement for the furnace door 3 can furthermore be provided to prevent a collision between the two furnace doors 3, 3' during lowering out of the combustion chamber 2 and raising up into the combustion chamber.

With the exception of the embodiment of FIG. 9, the depositing region is always arranged outside the direct thermal radiation field of the open combustion chamber 2. As is the case here in a vertical furnace, this can, for example, be below the furnace door or on the furnace itself or even laterally adjacent to it.

Figure 11:
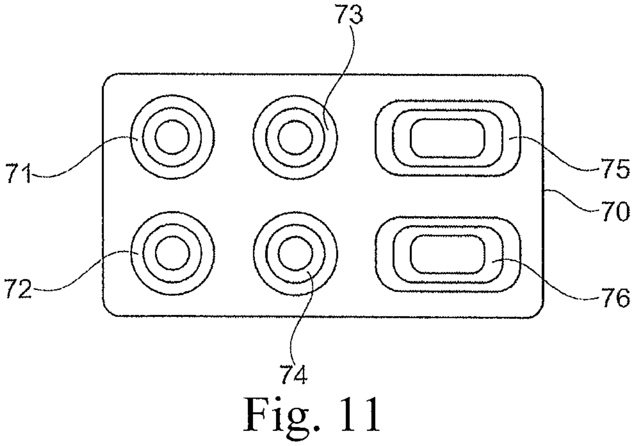
FIG. 11 a plurality of supports having a plurality of cooling devices arranged in a housing.

FIG. 11 shows a plurality of supports 71-74, 75, 76 of different sizes arranged in a housing 70, each of which interacts with one respective, not depicted, cooling device. Such a plurality of supports can be provided in both the furnace and the base. In the case in which measurement of the temperature via a sensor is provided individually for each support, the cooling device can provide a cooling output, which is dependent on the signal from the temperature sensor, by means of a control unit. The cooling output of the plurality of cooling devices can therefore be operated individually and in a temperature-dependent manner with the aid of a not depicted controller.

Figure 12:
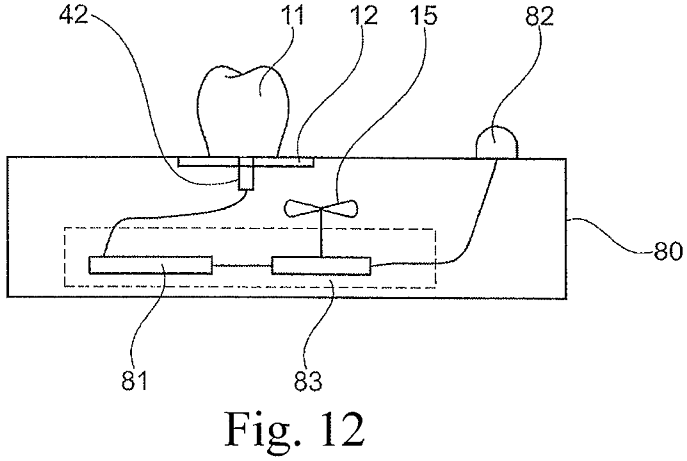
FIG. 12 a base with a control unit.

FIG. 12 shows a base 80 with a temperature sensor 42 in the support 12 and with comparison means 81, to compare the temperature of the component 11 to be cooled and arranged on the support, which is measured by the temperature sensor 42, to a predetermined limit temperature. The reaching of the limit temperature is displayed via display means 82.

The comparison means 81 can be part of a control unit 83 for the cooling device, which provides a cooling output that is dependent on the signal of the means for temperature measurement 42, for example by controlling the speed of the fan 15.

The invention claimed is:

1. Furnace having a vertical orientation for heating at least one dental component, comprising a combustion chamber, which is open at the bottom, and the opening of which can be closed by means of a furnace door, which is lowered in the vertical direction in the open position, and comprising a depositing region for a heated component, which depositing region is arranged at a distance from the opening in the combustion chamber, wherein the depositing region is part of the furnace, and a cooling device that acts on the depositing region is arranged on or in the furnace, wherein the depositing region comprises a heat-resistant support for the heated component and that the cooling device acts on the support, and wherein the support (i) comprises ventilation openings, by means of which a cooling air flow is guided onto the heated component to be arranged in the depositing region on the support or (ii) is cooled with the aid of a Peltier element, which is thermally coupled directly to the support.

2. Furnace according to claim 1, wherein when the support region comprises ventilation openings, the ventilation openings are fluidically connected to a fan to provide a cooling air flow.

3. Furnace according to claim 2, wherein when the support region comprises ventilation openings an air-permeable, heat-insulating insert part is arranged between the fan and the support.

4. Furnace according to claim 1, wherein the depositing region is arranged outside a thermal radiation field of the open combustion chamber.

5. Furnace according to claim 1, wherein the furnace comprises two furnace doors, of which one furnace door is brought into a cooling position after the opening of the combustion chamber has been cleared, while the other furnace door closes the combustion chamber in the closed position.

6. Furnace according to claim 1, further comprising a device for automatically repositioning the heated component from the open combustion chamber into the depositing region.

7. Furnace according to claim 6, wherein the device for automatically repositioning the heated component comprises a gripper arm or a robot arm.

8. Furnace according to claim 6, wherein the device for automatically repositioning the heated component comprises a tappet, a chute and a collecting basket.

9. Furnace according to claim 1, wherein the depositing region or the support comprises means for temperature measurement in the depositing region or the support or the component to be cooled.

10. Furnace according to claim 9, wherein comparison means and display means are provided, to compare the temperature of the component to be cooled to a predetermined limit temperature and to display said temperature when the limit temperature is reached.

11. Furnace according to claim 9, wherein, with the aid of a control unit, the cooling device provides a cooling output which is dependent on the signal of the means for temperature measurement.

12. Furnace according to claim 1, wherein a plurality of supports having a plurality of cooling devices are provided in a housing.

13. Furnace according to claim 12, wherein the cooling output of each support is individually controllable.

14. Furnace according to claim 1, wherein the cooling device is arranged at a distance from the depositing region in a housing section, past which the component is moved when the component is brought out of the combustion chamber.

* * * * *